US009355337B2

(12) United States Patent
McAuley et al.

(10) Patent No.: US 9,355,337 B2
(45) Date of Patent: May 31, 2016

(54) CONSISTENT HIERARCHICAL LABELING OF IMAGE AND IMAGE REGIONS

(75) Inventors: Julian McAuley, Canberra (AU); Teofilo E. de Campos, Guildford (GB); Gabriela Csurka, Crolles (FR); Florent Perronnin, Domene (FR)

(73) Assignee: XEROX CORPORATION, Norwalk, CT (US)

(*) Notice: Subject to any disclaimer, the term of this patent is extended or adjusted under 35 U.S.C. 154(b) by 1811 days.

(21) Appl. No.: 12/546,948

(22) Filed: Aug. 25, 2009

(65) Prior Publication Data

US 2011/0052063 A1 Mar. 3, 2011

(51) Int. Cl.

| | |
|---|---|
| ***G06K 9/62*** | (2006.01) |
| ***G06K 9/52*** | (2006.01) |
| ***G06K 9/00*** | (2006.01) |

(52) U.S. Cl.

CPC .......... *G06K 9/6219* (2013.01); *G06K 9/00684* (2013.01); *G06K 9/527* (2013.01); *G06K 9/6292* (2013.01)

(58) Field of Classification Search

CPC ........................... G06K 9/6219; G06K 9/6282

See application file for complete search history.

(56) References Cited

U.S. PATENT DOCUMENTS

| | | | | |
|---|---|---|---|---|
| 2008/0075367 | A1* | 3/2008 | Winn et al. | 382/180 |
| 2010/0128984 | A1* | 5/2010 | Lempitsky et al. | 382/180 |

OTHER PUBLICATIONS

Kolmogorov et al., "What Energy Functions Can Be Minimized via Graph Cuts," IEEE Transactions on Pattern Analysis and Machine Intelligence, vol. 28, No. 2, Feb. 2004.

Ramanan et al. "Tracking People by Learning their Appearance" IEEE Pattern Analysis and Machine Intelligence (PAMI). Jan. 2007.

Szeliski et al., "A Comparative Study of Energy Minimization Methods for Markov Random Fields with Smoothness-Based Priors," IEEE Transactions on Pattern Analysis and Machine Intelligence, vol. 30, No. 6, Jun. 2008.

Lazebnik et al., "Beyond Bags of Features: Spatial Pyramid Matching for recognizing Natural Scene Categories," Computer Vision and Pattern Recognition, 2006 IEEE Computer Society Conference on, vol. 2, pp. 2169-2178 (2006).

Scharstein et al., "Learning Conditional Random Fields for Stereo," IEEE Conference on computer Vision and Pattern Recognition, MN, pp. 1-8, Jun. 2007.

Teo et al., "A Scalable Modular Convex Solver for Regularized Risk Minimization," Proceedings of the 13th ACM SOGKDD Intl. Conference on Knowledge Discovery and Data Mining, CA, pp. 727-736 (2007).

Lempitsky et al., "LogCut—Efficient Graph cut Optimization for Markov Random Fields," IEEE 11th Intl. Conference on Computer Vision, Rio de Janeiro, pp. 1-8, Oct. 2007.

(Continued)

*Primary Examiner* — Vu Le
*Assistant Examiner* — Kenny Cese
(74) *Attorney, Agent, or Firm* — Fay Sharpe LLP

(57) ABSTRACT

Classification of image regions comprises: recursively partitioning an image into a tree of image regions having the image as a tree root and at least one image patch in each leaf image region of the tree, the tree having nodes defined by the image regions and edges defined by pairs of nodes connected by edges of the tree; assigning unary classification potentials to nodes of the tree; assigning pairwise classification potentials to edges of the tree; and labeling the image regions of the tree of image regions based on optimizing an objective function comprising an aggregation of the unary classification potentials and the pairwise classification potentials.

20 Claims, 10 Drawing Sheets

(56) References Cited

OTHER PUBLICATIONS

Shi et al., "Normalized cuts and Image segmentation," IEEE Transactions on Pattern Analysis and Machine Intelligence, vol. 22, No. 8, Aug. 2000.
Stenger et al., "Model-Based Hand Tracking Using a Hierarchical Bayesian Filter," IEEE Transactions on Pattern Analysis and Machine Intelligence, vol. 28, No. 9, Sep. 2006.
Li et al., Multiresolution image classification by hierarchical modeling with two-dimensional hidden Markov model IEEE Trans. Inform. Theory 46 1826-1841 (2000).
Shotton et al., "TextonBoost for Image Understanding: Multi-Class Object Recognition and Segmentation by Jointly Modeling Texture, Layout, and Context," ISSN vol. 81, No. 1, Jan. 2009.
Tsochantaridis et al., "Support Vector Machine Learning for Interdependent and structured Output Spaces," Proceedings of the 21st Intl. Conference on Machine Learning, Canada (2004).
Lowe, "Distinctive Image Features from Scale-Invariant Keypoints," International Journal of Computer Vision (2004).
Sivic et al., "Unsupervised Discovery of Visual Object Class Hierarchies," IEEE Conference on Computer Vision and Pattern Recognition, AK, pp. 1-8, Jun. 2008.
Yedidia et al., "Generalized Belief Propagation", Advances in Neural Information Processing Systems (NIPS), vol. 13, pp. 689-695, Dec. 2000.
Kohli et al., "On Partial Optimality in Multi-label MRFs," Proceedings of the 25th Internatioanl Conference on Machine Learning, Helsinki, Finland (2008).
Ishikawa, "Exact optimization for Markov random fields with convex priors," IEEE Transactions on Pattern Analysis and Machine Intelligence, vol. 25, No. 10., Oct. 2003.
Boykov et al., "An Experimental Comparison of Min-cut/Max-Flow Algorithms for Energy Minimization in Vision," IEEE Transactions on Pattern Analysis and Machine Intelligence, vol. 26, No. 9, Sep. 2004.
Cour et al., "Learning Spectral Graph Segmentation," IEEE International Conference on Artificial Intelligence and Statistics (AISTAT) 2005.
Csurka et al., "A Simple High Performance Approach to Semantic Segmentation," British Machine Vision Conference, Leeds, UK, Sep. 1-4, 2008.
Everingham et al., "The PASCAL Visual Object Classes Challenge 2007 (VOC2007), Part 1—Challenge & Classification Task," In 1st PASCAL Challenge Workshop, at http://www.pascalnetwork.org/challenges/VOC/voc2007/workshop/index.html; (2007).
Everingham et al., "The PASCAL Visual Object Classes Challenge 2007 (VOC2007), Part 2—Detection Task," In 1st PASCAL Challenge Workshop, at http://www.pascalnetwork.org/challenges/VOC/voc2007/workshop/index.html; (2007).
Everingham et al., "Visual Object Classes Challenge 2008 (VOC2008), VOC Results," at http://pascallin.ecs.soton.ac.uk/challenges/VOC/voc2008/, (2008).
Felzenszwalb et al., "A Discriminatively Trained, Multiscale Deformable Part Model," Computer Vision and Pattern Recognition 2008, CVPR 2008, Conference on Publication, Jun. 2008.
Finley et al., "Training Structural SVMs when Exact Inference is Intractable," Proceedings of the 25th International Conference on Machine Learning, Helsinki, Finaland (2008).
He et al., "Multiscale conditional Random Fields for Image Labeling," Proceedings of the 2004 IEEE Computer Scoiety Conference on Computer Vision and Pattern Recognition (CVPR '04) (2004).
Grauman et al., "the pyramid match kernel: discriminative classification with sets of image features," Tenth IEEE International Conference on Computer Vision, ICCV 2005, vol. 2, Oct. 2005.
Aji et al., "The Generalized Distributive Law and Free Energy Minimization," In Proceedings of the Allerton Conference on Communication, Control, and Computing (pp. 672-681). Urbana, IL: University of Illinois, 2001.
Boykov et al., "Fast Approximate Energy Minimization via Graph Cuts," IEEE Transactions on PAMI, vol. 23, No. 11, pp. 1222-1239 (2001).

* cited by examiner

CONSISTENT HIERARCHICAL LABELING OF IMAGE AND IMAGE REGIONS

BACKGROUND

The following relates to the image processing arts, image retrieval arts, image archiving arts, and related arts.

Automated tagging or classification of images is useful for diverse applications such as image archiving, image retrieval, and so forth. In a typical approach, a number of image key points or patches are selected across the image. Each key patch is quantified by a features vector having elements quantitatively representing aspects of the key patch. These feature vectors are then used as inputs to a trained classifier that outputs a class label (or vector of class label probabilities, in the case of a soft classifier) for the image.

A problem with this global approach is that it is not well-suited to tagging images containing multiple subjects. For example, an image showing a person may be accurately tagged with the "person" class, while an image showing a dog may be accurately tagged with the "dog" class—but a single image showing a person walking a dog is less likely to be accurately classified.

A known approach for such problems is to segment the image into smaller regions, and to classify the regions separately. Since the size of the subject or subjects shown in the image is not known, the segmentation into regions may employ different scales of region size. Since the different region sizes have different numbers of pixels, it is also known to use different classifiers for the different region sizes, for example an image-scale classifier, a patch-scale classifier (operative for an image region containing a single patch), and additional "mid-scale" classifiers for various intermediate region sizes.

Such segmentation approaches have numerous deficiencies. First, there is no basis for knowing a priori which region size is best for classifying a given subject in an image. For example, in the aforementioned example of an image of a person walking a dog one might suspect that the optimal region size for classifying the dog is the region size just encompassing the dog in the image. But, if it turns out that the dog's snout is the most "characteristic" feature of the dog (for example, possibly the feature that best distinguishes images of dogs from images of cats) then the optimal region size might be the region size that just encompasses the dog's snout.

Moreover, some correlations between classifications of overlapping or contained regions of different scales might be expected. For example, the image region encompassing the dog may be (correctly) classified as "dog" while the smaller-scale regions that make up the region encompassing the dog might be (erroneously) misclassified as something other than "dog". In some cases, a correlation may be found in which this pattern of a larger region classifying as "dog" and its constituent smaller regions not classifying as "dog" may itself be characteristic of images of dogs. Existing image region classifiers do not provide any principled way to identify and utilize such correlations between image regions of different size scales.

BRIEF DESCRIPTION

In some illustrative embodiments disclosed as illustrative examples herein, an image classifier comprises a digital processor configured to perform operations comprising recursively partitioning an image into a tree of image regions having the image as a tree root and at least one image patch in each leaf image region of the tree, classifying the image regions using at least one classifier, and outputting classification values for the image regions based on the classifying and on weights assigned to the nodes and edges (or node and edge features) of the tree.

In some illustrative embodiments disclosed as illustrative examples herein, an image classification method comprises: recursively partitioning an image into a tree of image regions having the image as a tree root and at least one image patch in each leaf image region of the tree, the tree having nodes defined by the image regions and edges defined by pairs of nodes connected by edges of the tree; assigning unary classification potentials to nodes of the tree; assigning pairwise classification potentials to edges of the tree; and labeling the image regions of the tree of image regions based on optimizing an objective function comprising an aggregation of the unary classification potentials and the pairwise classification potentials.

In some illustrative embodiments disclosed as illustrative examples herein, a storage medium stores instructions executable by a digital processor to perform an image classification method comprising: recursively partitioning an image into a tree of image regions having the image as a tree root and at least one image patch in each leaf image region of the tree, the tree having nodes defined by the image regions and edges defined by pairs of nodes connected by edges of the tree; assigning classification values to each node using a plurality of classifiers trained at different image size scales; assigning a unary classification potential to each node based on the classification values assigned using the plurality of classifiers; assigning a pairwise classification potential to each edge of the tree based on the classification values assigned using the plurality of classifiers trained at different image size scales and on inheritance constraints defined by a hierarchy of classes; and labeling the image regions of the tree of image regions based on optimizing an objective function comprising an aggregation of the unary classification potentials and the pairwise classification potentials.

DETAILED DESCRIPTION

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
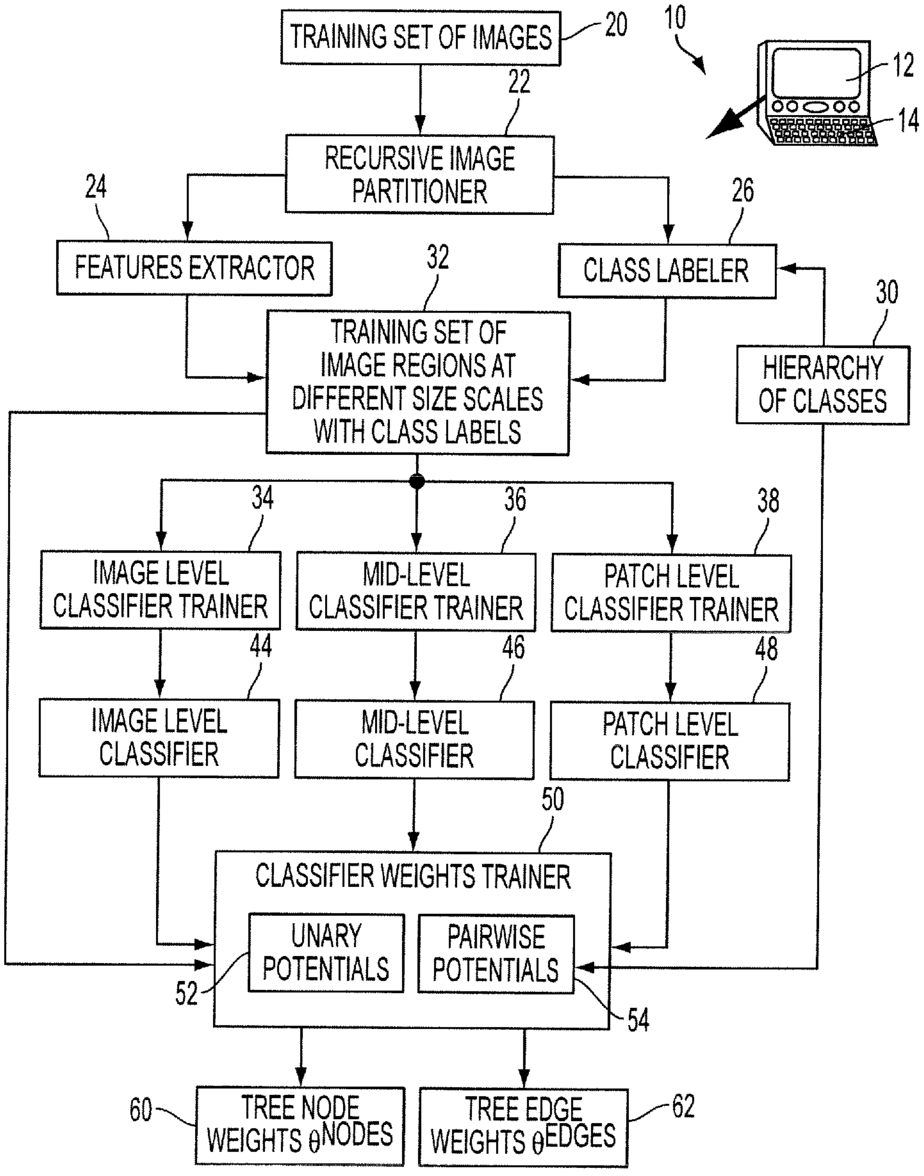
FIG. 1 diagrammatically shows a system for training an image region classifier.

With reference to FIG. 1, a digital system includes a computer 10 or other digital processing device that includes a digital processor. The digital processor can be variously embodied, such as by a single-core processor, a dual-core processor (or more generally by a multiple-core processor, a digital processor and cooperating math coprocessor, a digital controller, or so forth. The illustrated computer 10 is a desktop or laptop computer including a display 12 and a keyboard 14. Other interfacing devices, such as a second monitor, a mouse or trackball, or so forth can also be included. On the other hand, the illustrated computer 10 can be replaced by another digital processing device such as a network server having only network interfacing (for example, Internet or local area network (LAN) interfacing), or so forth.

The computer 10 or other digital processing device includes or has access to a storage medium (not shown) that stores instructions that are executable by the digital processor to perform the image region classification operations and related process operations as disclosed herein. The storage medium may, for example, include one or more of the following: a hard disk drive or other magnetic storage medium; an optical disk or other optical storage medium; a random access memory (RAM), read-only memory (ROM), flash memory or other electronic memory medium; or so forth.

With reference to FIG. 1, the disclosed image region classifier employs a plurality of image region classifiers trained at different size scales. Toward this end, a training set of images 20 is processed by a recursive image partitioner 22 that recursively partitions each training image into a tree of image regions where each image region is a node of the tree, the unpartitioned image serves as the root node of the tree. Each image region is generated by partitioning a larger image region, and this is indicated conceptually by an edge of the tree connecting the image region with the larger image region from which it was partitioned.

Figure 2:
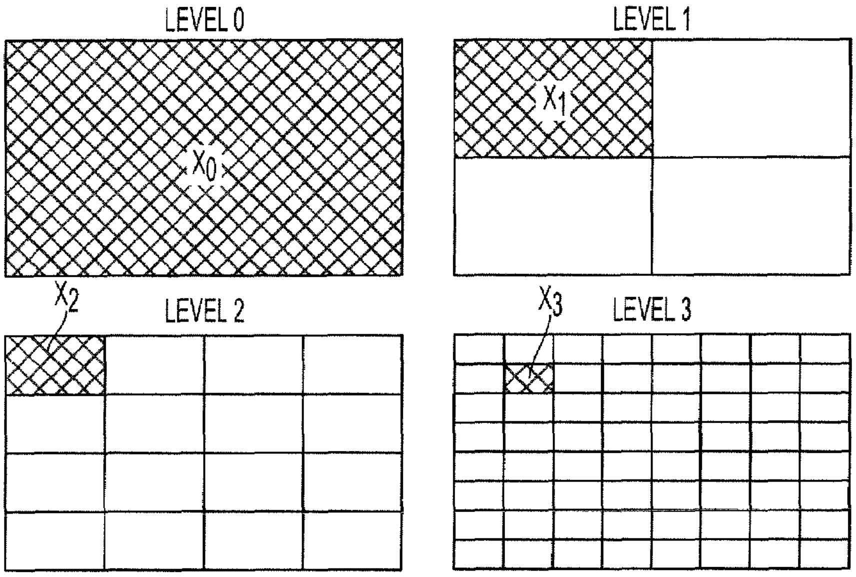
FIG. 2 diagrammatically shows an illustrative recursive partitioning of an image into image regions.
Figure 3:
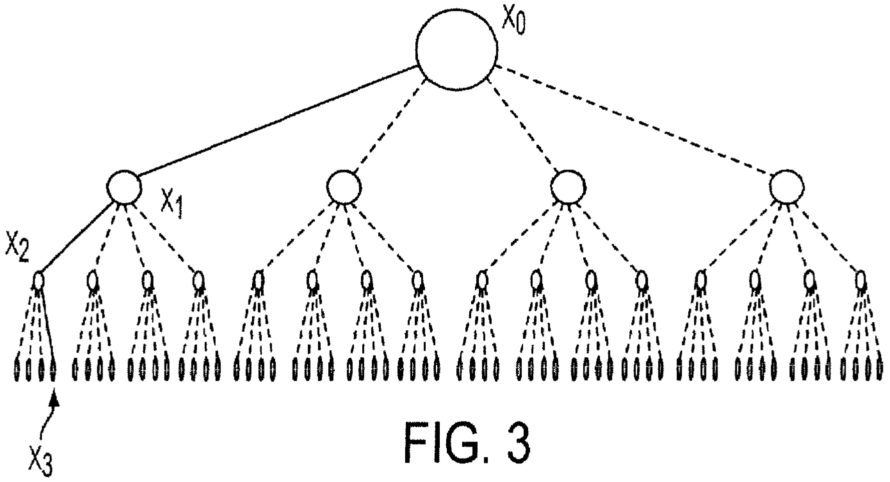
FIG. 3 diagrammatically shows a tree structure generated by the illustrative partitioning of FIG. 2.

With continuing reference to FIG. 1 and with further reference to FIGS. 2 and 3, the tree of image regions generated by the recursive partitioner 22 are further described. The tree structure or tree model is denoted herein as $\mathcal{M}$, and is made up of a set of nodes denoted $\mathcal{X}$, where each node is denoted $x_{l,(i,j)}$ where the index l is the level of the node in the tree structure or model $\mathcal{M}$ and the indices (i,j) denote a grid position in the image. FIG. 2 shows an example of recursive partitioning using recursive 2×2 splitting of each image region so as to form the tree structure or model $\mathcal{M}$ as a quadtree. An edge of the tree structure connects any given node (excepting the root node) with the "parent" node that was partitioned to form the given node.

A consequence of this recursive partitioning is that a node (that is, an image region) on a level k is connected to a node on level k+1 if and only if the regions corresponding to these nodes overlap. More formally, in the quadtree model a parent node $x_{k(i,j)}$ is connected to the following four child nodes: $x_{k+1,(2i,2j)}$, $x_{k+1,(2i,2j+1)}$, $x_{k+1,(2i+1,2j)}$, and $x_{k+1,(2i+1,2j+1)}$. Equivalently, a child node $x_{k,(i,j)}$ is connected with a single parent node $x_{k-1,(i/2,j/2)}$. Other partitioning beside the illustrative quadtree 2×2 splitting can be employed—for example, each image region can be split into nine regions using a 3×3 splitting. For images that have a substantially non-square aspect ratio, an anisotropic splitting such as a 2×3 recursive splitting is contemplated. In yet other embodiments, a tree-based split that is not grid-structured is contemplated. For example, a segmentation algorithm could be applied to produce small regions of various shapes, which are gradually combined into larger regions and eventually into the entire image.

Moreover, three-dimensional images can be similarly processed by splitting in three dimensions, yielding nodes designated $x_{l,(i,j,z)}$ where z denotes the grid position in the third dimension. For example, an octree structure or model can be formed for a three-dimensional image by using a 2×2×2 splitting in which each image region is recursively split in isotropic fashion into eight child regions.

FIG. 3 shows the tree structure including edges and nodes corresponding to image regions generated by the recursive partitioning shown in FIG. 2. In FIG. 2, an illustrative node at level 3 is denoted as $x_3$ (or, more completely, as $x_{3,(1,1)}$) and its parent node at level 2 is denoted as $x_2$ (or, more completely, $x_{2,(0,0)}$) whose parent node at level 1 is denoted as $x_1$ (or, more completely, $x_{1,(0,0)}$) whose parent (root) node at level 0 is the source image and is denoted as $x_0$. The image regions $x_0$, $x_{1,(0,0)}$, $x_{2(0,0)}$, $x_{3(1,1)}$ are shaded in FIG. 2. The corresponding nodes are labeled in the corresponding tree structure diagrammatically depicted in FIG. 3, where edges connecting these image region nodes are drawn in thick solid lines (remaining edges are drawn in thinner dashed lines in FIG. 3). It will be noticed that the tree structure or model is undirected.

In the tree model or structure, there are no edges between nodes at a given level (see the quadtree of FIG. 2 as an illustrative example). As disclosed herein, pairwise potentials between a pair of nodes connected by an edge are used to encode inheritance constraints defined by a hierarchy of classes. Since no edges connect nodes within a level, neighborhood constraints are not directly enforced - that is, the classification of one image region at a given tree level does not directly influence the classification of neighboring image regions at the given tree level. However, neighborhood constraints are applied indirectly, due to the fact that neighboring image regions within a level may be connected to a common subsuming parent region at the next higher level. The tree-based approach disclosed herein advantageously results in a tractable graphical model such as a quadtree model; whereas enforcing neighborhood constraints directly typically entails resort to approximate forms of belief propagation or other approximation.

With continuing reference to FIG. 1, a features extractor 24 extracts features from image key patches distributed across the image. The recursive partitioning and features extraction are configured to ensure that at least one image key patch is present in each leaf image region of the tree. As a result, each image region (that is, each node) of the tree is characterized by features of at least one image key patch. Toward this end, the number of levels in the tree structure is selected based on the size of the image and how densely image key patches are sampled (or, alternatively, the density of sampled image key patches is selected to ensure at least one image key patch is present in each image region of the tree structure). In some embodiments, the image regions on the bottom level (that is, the leaf nodes of the tree structure) each contain (and hence essentially correspond to) a single image key patch.

With continuing reference to FIG. 1, a class labeler 26 labels each image region of the tree structure for the training images 20. The class labeler 26 may, for example, employ the computer 10 as a graphical user interface whereby each image region is displayed (preferably in context of the overall image or a surrounding portion thereof for the smaller image regions) and a human user annotates or labels each displayed image region with a class label. This manual class labeler 26 operates on the training images set 20 as part of the training;

subsequently, the trained image regions classifier will assign class labels to image regions of input images that are not part of the training set 20.

Figure 4:
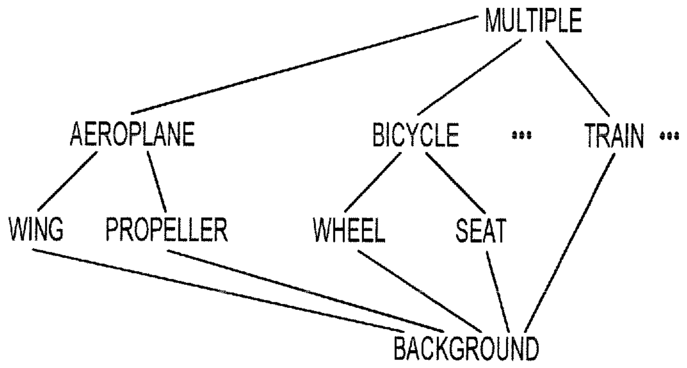
FIG. 4 diagrammatically shows an illustrative hierarchy of classes.

With continuing reference to FIG. 1 and with further reference to FIG. 4, the class labels are selected from a hierarchy of classes 30 denoted herein as $\mathcal{H}$. As disclosed herein, during image region classification the hierarchy of classes 30 is enforced or applied via pairwise (edge) potentials along the edges of the tree structure to ensure that nodes on higher levels of the tree structure (that is, nodes with smaller values of l) will always be assigned to a class that is at least as generic as its child nodes at lower levels (e.g., l+1) that are subsumed by the larger image region at the higher level. This is analogous to the notion of inheritance in object-oriented programming. FIG. 4 diagrammatically depicts an illustrative inheritance scheme for a hierarchy of classes. The topmost class "multiple" in the hierarchy of FIG. 4 indicates image content comprising a multiplicity of objects. Below this topmost class are object classes "aeroplane", "bicycle", "train", and so forth. Below these object classes are lower-level classes designating images of constituent or component objects. For example, under the class "aeroplane" in the hierarchy are the lower classes "wing" and "propeller", these being typical components of (non-jet) aeroplanes, while under the class "bicycle" are the lower classes "wheel" and "seat". In the illustrative hierarchy of classes of FIG. 4, a class "background" corresponding to image background is a child of all specific (e.g., object) classes. This placement of the "background" class is advantageous because the recursive partitioning of the image may result in image regions that in general do not precisely delineate an object. Thus, for example, an image region that includes a bicycle but also some background content may be classified as "bicycle" on a higher level, but may be recursively partitioned into lower level (i.e., smaller) image regions some of which are classified as "background". The hierarchy of classes shown in FIG. 4 is merely an illustrative example. In other hierarchies, for example, additional or different classes can be included. It is contemplated to have image classes representing clusters of more specific classes. For example, a class "indoor scene" may have lower level classes for "tables" and "chairs", while a class "outdoor scene" may have lower level classes such as "sheep" and "horses" and "automobiles".

In the mathematical notation used herein, class inheritance is represented by the notation $a<b$ where class a is less specific than class b. Using the illustrative hierarchy of classes shown in FIG. 4 as an example, the inheritance bicycle<wheel holds, because the class "bicycle" is less specific than the class "wheel". For the hierarchy of FIG. 4, in all cases the inheritance c<background holds, where c denotes any class other than "background".

The output of the processing of the training images 20 performed by processing components 22, 24, 26 is a training set of image regions at different size scales with class labels 32. In a variant embodiment of the classifier training system shown in FIG. 1, the illustrated recursive image partitioner 22 is optionally replaced by a manual image partitioner. For example, such a manual image partitioner suitably allows a user to employ manually drawn bounding boxes to delineate image regions at different size scales. An advantage of this latter approach is that the user can more precisely bound images of objects of interest (for example, images of aeroplanes, trains, and bicycles, and of wings, propellers, wheels, and seats, in the case of the hierarchy of classes of FIG. 4). This may enable creation of more representative image regions for the training.

The image regions classifier disclosed herein employs a smooth combination of classifiers trained at different size scales in combination with enforcement of class inheritance constraints across levels of the tree structure. The inheritance constraints can be understood as imposing on the class $c_{k+1}$ of an image region $x_{k+1}$ and a class $c_k$ of a larger image region $x_k$ that subsumes the image region $x_{k+1}$ the inheritance constraint that either $c_k<c_{k+1}$ or $c_k=c_{k+1}$. Toward this end, the classifications of the image regions defined by the tree structure are optimized together by optimizing a suitable objective function comprising an aggregation of (i) unary potentials for the nodes that embody the combination of classifiers trained at different size scales and (ii) pairwise potentials for the edges that embody the class inheritance constraints.

Thus, the training of the image regions classifier entails two components: (i) generating the classifiers trained at different size scales; and (ii) training parameters of the objective function which incorporates these classifiers trained at different size scales.

With reference to FIG. 1, training operation (i) in the illustrated embodiment employs: an image level classifier trainer 34 which employs as training data the unpartitioned images (or equivalently, image regions at level 0); a mid-level classifier trainer 36 which employs as training data image regions at a selected size scale between level 0 and the leaf level; and a patch-level (more generally, leaf-level) classifier trainer 38 which employs as training data image regions at the leaf level, which in the illustrated embodiment corresponds to the image key patch level. The image level classifier trainer 34 generates an image level classifier 44 that is trained at the image level (i.e., level 0). The mid-level classifier trainer 36 generates a mid-level classifier 46 that is trained at an intermediate size scale. The patch-level classifier trainer 38 generates a patch-level classifier 48 that is trained at the leaf level, which in the illustrated embodiment corresponds to the image key patch level. Optionally, classifiers can be trained at more or fewer size scales. For example, the tree structure of FIGS. 2 and 3 would be conducive to four classifiers trained at level 0, level 1, level 2, and (leaf) level 3, respectively. The classifier trainers 34, 36, 38 can use substantially any suitable training algorithm, and the classifiers 44, 46, 48 trained at different size scales can employ substantially any suitable classification algorithm. In some embodiments, the classifiers 44, 46, 48 are first-order classifiers.

With continuing reference to FIG. 1, once the constituent classifiers 44, 46, 48 are trained the second training operation (ii) is performed, namely training parameters of the objective function which incorporates these classifiers 44, 46, 48 trained at different size scales. Toward this end, a classifier weights trainer 50 trains unary potentials 52 for the nodes and pairwise potentials 54. The unary potentials 52 embody the combination of classifiers 44, 46, 48 trained at different size scales. The pairwise potentials 54 correspond to the edges of the tree structure and embody the class inheritance constraints.

The unary potentials 52 are suitably parameterized by the classifiers 44, 46, 48 trained at different size scales weighted by node weightings 60. To begin with, a single classifier is considered. The unitary potential for a region $x_{k(i,j)}$ is then suitably written as:

$$E(x_{k,(i,j)};y_{k,(i,j)})=\left\langle \Phi^1(x_{k,(i,j)};y_{k,(i,j)}),\theta^{nodes}\right\rangle \quad (1)$$

where $y_{k,(i,j)}$ is the class label to which the region $x_{k,(i,j)}$ is assigned by the classifier, $\Phi^1$ is a joint feature map of the nodes $x\in\mathcal{X}$ and assignments $y\in\mathcal{H}$, and $\theta^{nodes}$ iodes denotes the node weightings 60 and is suitably represented as a parameter vector parameterizing $\Phi^1(x_{k,(i,j)};y_{k,(i,j)})$ which represents the class probabilities generated by the classifier.

In one illustrative case, it is desired to ensure that the class label given to $x_{k(i,j)}$ was given a high probability according to the first-order classifier. Specifically, suppose that the classifier returns a vector of probabilities $P_x$; then the joint feature map may suitably be written as:

$$\Phi^1(x, y) = \underbrace{(0, \ldots, P_{x,y}, \ldots, 0)}_{0 \text{ everywhere except the } y^{th} \text{ entry}}, \quad (2)$$

In words, if x is assigned the class y, then the probability given by the first-order model should be high (weighted by the node weights $\theta_y^{nodes}$ 60). To simplify, $E(x;y)=P_{x,y}\theta_y$. The formulation of Equation (2) expresses this as a linear function of the node weights $\theta^{nodes}$ 60. If P represents a probability, then the product of probabilities should be maximized, or equivalently, the sum of log-probabilities should be maximized. More generally, if P does not represent a probability, then either a sum or product may be maximized.

This unary potential is readily extended to parameterization by a plurality of classifiers. In this case the multiple classifiers return probabilities $P_x^1, \ldots, P_x^C$ (for instance, features based on histograms of orientations; features based on RGB statistics, or so forth). In this case, the joint feature map can be written as a concatenation of the individual feature maps defined by each classifier (and thus, it will be nonzero in exactly C locations). In the illustrated embodiment, the unary potential is parameterized by the set of classifiers 44, 46, 48 trained at different size scales. However, it is contemplated to employ parameterization by more than or fewer than the illustrated three classifiers 44, 46, 48 trained at different size scales. Still further, it is contemplated to employ parameterization by a plurality of classifiers that are different in ways other than the size scale used for training, such as for example differing by the employed classification algorithm.

Another generalization of the unary potential model is to learn a separate parameterization for each level of the hierarchy of classes 30. In this case, a copy of $\Phi^1(x,y)$ is processed for each level of the hierarchy, and an indicator function is used to "select" the current level.

The pairwise potentials for the edge connecting image region $x_k$ (with the remainder of the index suppressed) at level k with image region $x_{k+1}$ at level k+1 can be written as:

$$E(x_k,x_{k+1};y_k,y_{k+1}) = \left\langle \Phi^2(x_k,x_{k+1};y_k,y_{k+1}), \theta^{edges} \right\rangle. \quad (3)$$

Here the joint feature map $\Phi^2$ expresses two properties: first, the constraints of the hierarchy of classes 30 should be strictly enforced; secondly, nodes assigned to the same class on different levels should have similar probabilities (again using the probabilities $P(x_k)$ and $P(x_{k+1})$ returned by the classifier). To achieve these goals, the indicator function H is suitably defined as:

$$H(y_k \cdot y_{k+1}) = \begin{cases} \infty & \text{if } y_{k+1} \prec y_k \\ 0 & \text{if } y_k \prec y_{k+1} \\ 1 & \text{if } y_k = y_{k+1} \end{cases}. \quad (4)$$

This indicator function enforces the hierarchical constraints of the hierarchy of classes 30. There is no cost associated to assigning a child node to a more specific class—thus we are only parameterizing the cost when both class labels are the same. The joint feature map $\Phi^2$ incorporates the indicator function H of Equation (4) as follows:

$$\Phi^2(x_k,x_{k+1};y_k,y_{k+1}) = -H(y_k,y_{k+1})|P_{x_k}-P_{x_{k+1}}|^2, \quad (5)$$

where 51 p| is the elementwise absolute value of p.

Like the unary potentials, the pairwise (edge) potentials are readily extended to parameterization by a plurality of classifiers by writing the joint feature map as a concatenation of the individual feature maps. The generalization of learning a separate parameterization for each level of the hierarchy of classes 30 can also be made for the pairwise potentials, for example by processing a copy of $\Phi^2(x,y)$ for each level of the hierarchy, and using an indicator function to "select" the current level.

Having defined the unary and pairwise potentials, a suitable optimization function to be maximized (in this embodiment; other formulations may employ an optimization function to be minimized) may be written as follows:

$$g_\theta(\mathcal{X}) = \underset{\mathcal{Y}}{\arg\max} \sum_{x \in \mathcal{M}} \langle (0, \ldots, P_{x,y(x)}, \ldots, 0), \theta^{nodes} \rangle + \sum_{x_k, x_{k+1} \in \mathcal{M}} \langle H(y_k(x_k), y_{k+1}(x_{k+1}))|P_{x_k} - P_{x_{k+1}}|^2, \theta^{edges} \rangle, \quad (6)$$

where θ is a concatenation of the node and edge weight feature vectors ($\theta^{nodes}$; $\theta^{edges}$) and y(x) is the assignment given to x under $\mathcal{Y}$ (that is, the full set of labels). As the nodes in the image partition model $\mathcal{M}$ form a tree structure, the energy expressed in Equation (6) can be maximized using max-sum belief propagation, for example as set forth in Aji et al., "The generalized distributive law", IEEE Trans. on Information Theory vol. 46 no. 2, pages 325-43 (2000) which is incorporated herein by reference in its entirety. The running time for this maximization algorithm is of order $O(|\mathcal{M}||\mathcal{H}|^2)$, where $|\mathcal{M}|$ is the number of nodes and $|\mathcal{H}|$ is the number of classes.

The loss function specifies "how bad" a given assignment $\mathcal{X}$ is compared to the correct assignment $\mathcal{Y}$. For computational purposes during training, it can be advantageous for the loss function to decompose as a sum over nodes and edges in $\mathcal{M}$. To perform the training, the labels $\mathcal{Y}$ are provided using existing datasets. One option is to assign the class "multiple" to all image regions with which multiple bounding boxes intersect, to assign "background" to all image regions with which no bounding boxes intersect, and to assign a specific class label to all other image regions. In a suitable approach, a loss function is defined which is of the form:

$$\Delta(\mathcal{X}, \mathcal{Y}) = \sum_{i=1}^{|\mathcal{M}|} \delta(x_i, y_i). \quad (7)$$

One suitable loss function having this form is the Hamming loss function, which takes the value 0 when the region is correctly assigned, and $1/|\mathcal{M}|$ otherwise, where $|\mathcal{M}|$ is the number of regions (or more formally, $$\delta(x_i, y_i) = \frac{1}{|\mathcal{M}|}(1 - I_{\{x_i\}}(y_i)),$$

where when multiple classes are observed in a single region such that the correct label is "multiple" then no penalty is incurred if one of these specific classes is chosen). The loss may be scaled so that each level of the graphical model makes an equal contribution, that is, so that a mistake on level k makes four times the contribution as a mistake on level k+1.

Structured learning can be used, for example in a framework described in Tsochantaridis et al., "Support vector machine learning for interdependent and structured output spaces", in Predicting Structured Data, pages 823-30 (2004), which is incorporated herein by reference in its entirety. Given a training set $\mathcal{Y}^{1,1} \ldots \mathcal{Y}^{N,N}$, the goal is to solve:

$$\operatorname*{argmin}_{\theta} \left[ \underbrace{\frac{1}{N} \sum_{n=1}^{N} \Delta(g_\theta(\mathcal{X}^n), \mathcal{Y}^n)}_{\text{empirical risk}} + \underbrace{\lambda \|\theta\|^2}_{\text{regularization term}} \right]. \quad (8)$$

The structured learning algorithm described in Tsochantaridis et al. may be used to solve Equation (8) for the node and edge weights $\theta = (\theta^{nodes}; \theta^{edges})$ that minimize the sum of the empirical risk and regularization terms. In addition to solving Equation (8), it is also desired to solve:

$$g_\theta(\mathcal{X}) = \operatorname*{argmax}_{\mathcal{Y}} \sum_{x \in \mathcal{M}} \langle (0, \ldots, P_{x,y(x)}, \ldots, 0), \theta^{nodes} \rangle + \quad (9)$$

$$\sum_{x_k, x_{k+1} \in \mathcal{M}} \langle H(y_k(x_k), y_{k+1}(x_{k+1})) |P_{x_k} - P_{x_{k+1}}|^2, \theta^{edges} \rangle +$$

$$\Delta(\mathcal{X}, \mathcal{Y}),$$

that is, for a given value of θ, an assignment can be found which is consistent with the tree structure (Equation (6)), yet incurs a low loss. This procedure is known as column-generation, and can easily be solved in this scenario, as long as Δ( $\mathcal{X}, \mathcal{Y}$ ) decomposes as a sum over the nodes and edges in the tree model (which is true of the Hamming loss function).

Figure 5:
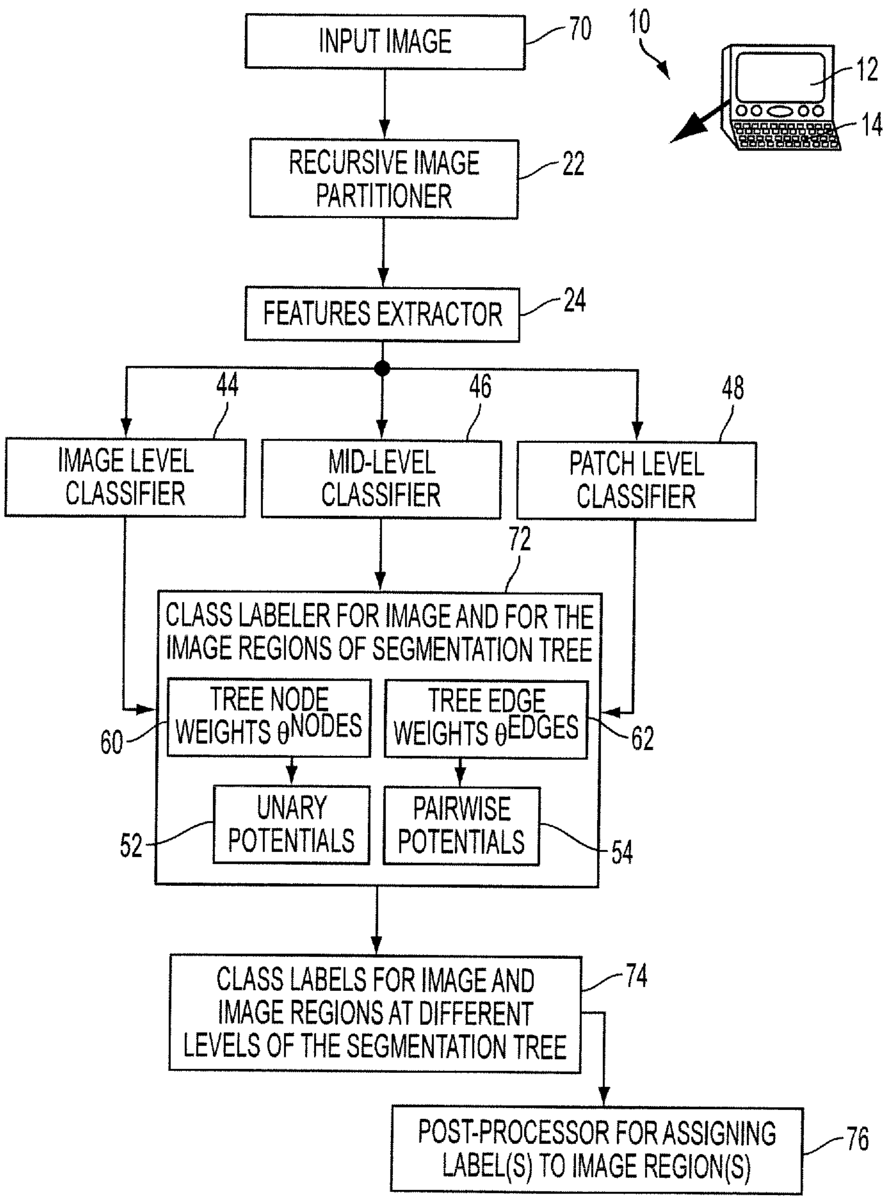
FIG. 5 diagrammatically shows an image region classifier trained using the training system of FIG. 1 employed in image region classification.
Figure 6A:
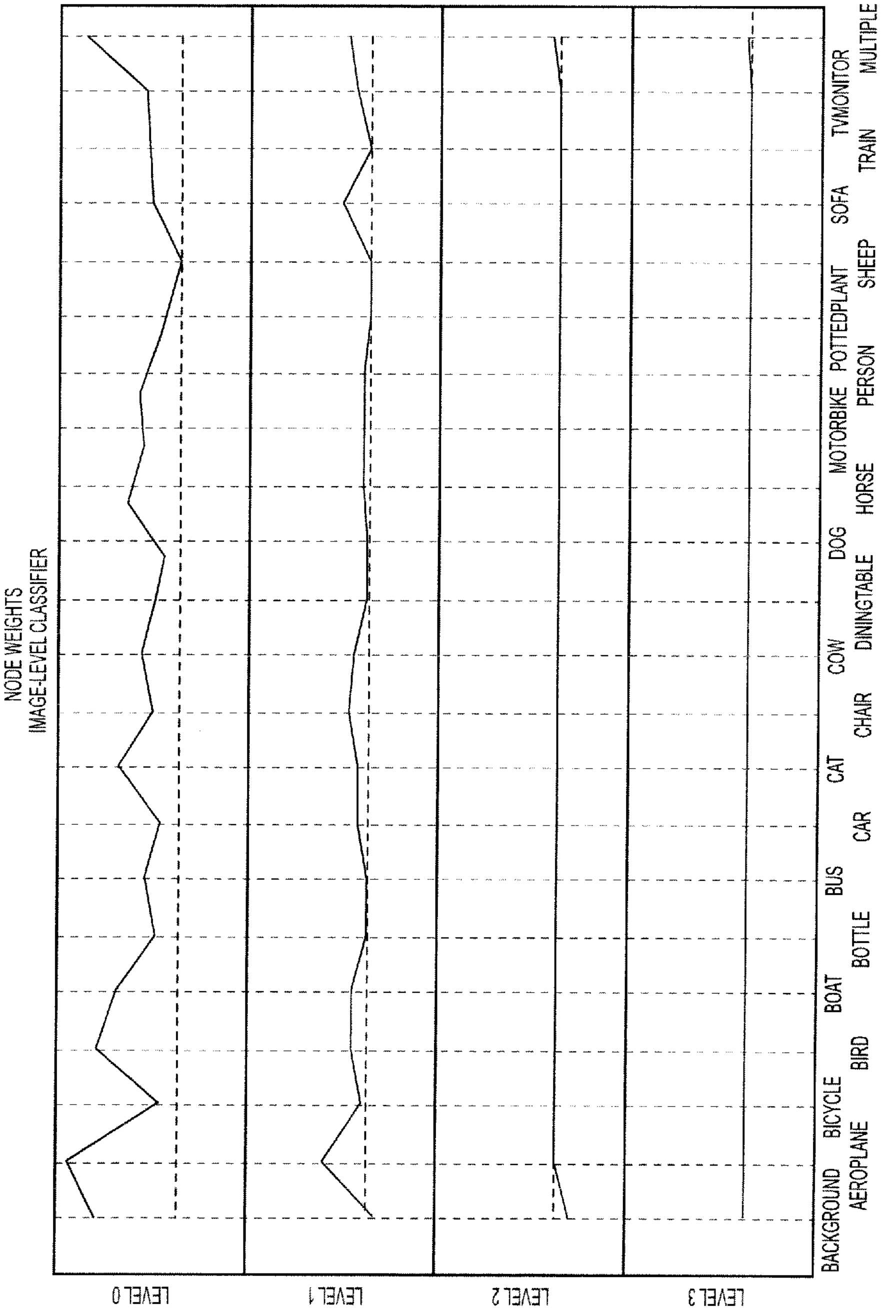
FIG. 6 plots node and edge weights for a classifier training example set forth herein.
Figure 6B:
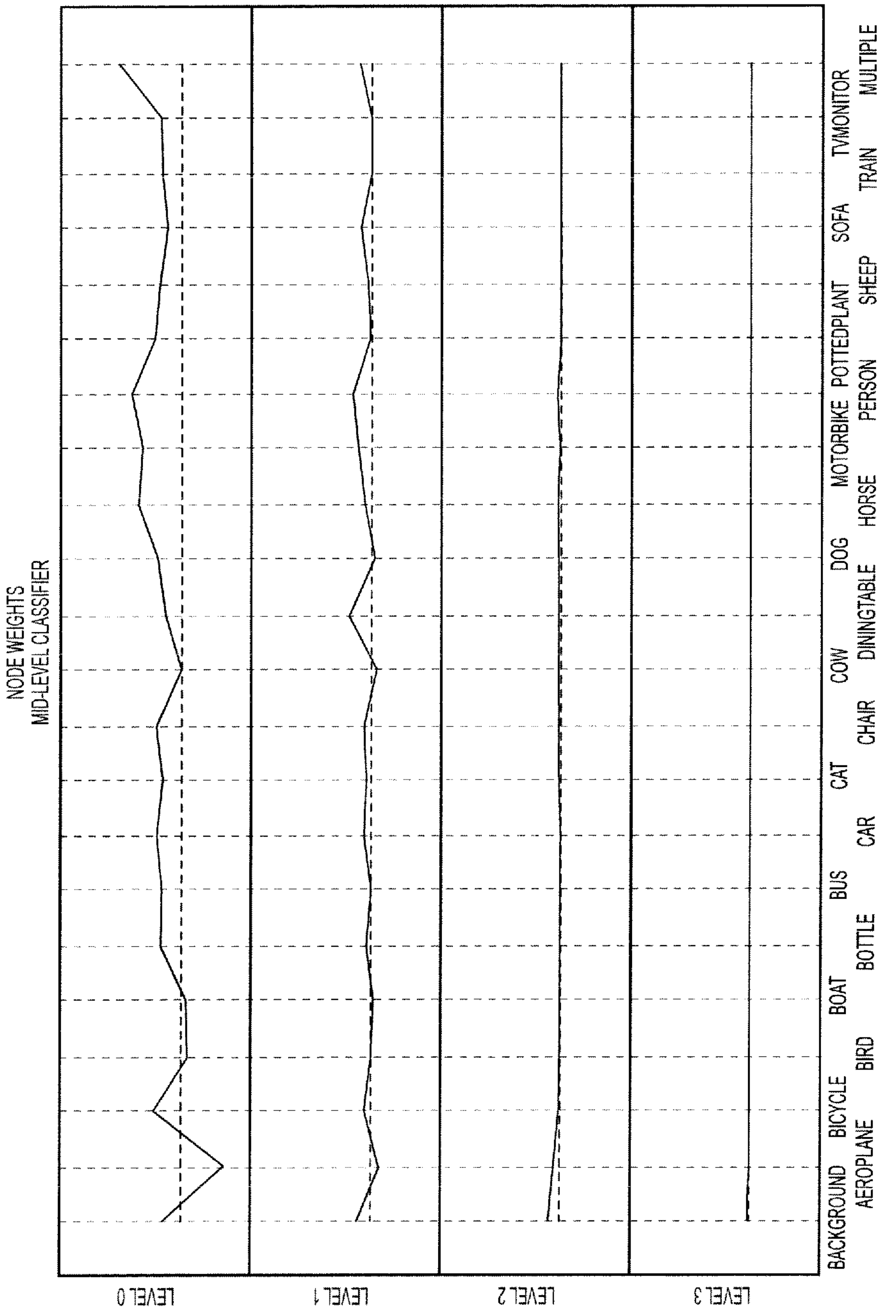
Figure 6C:
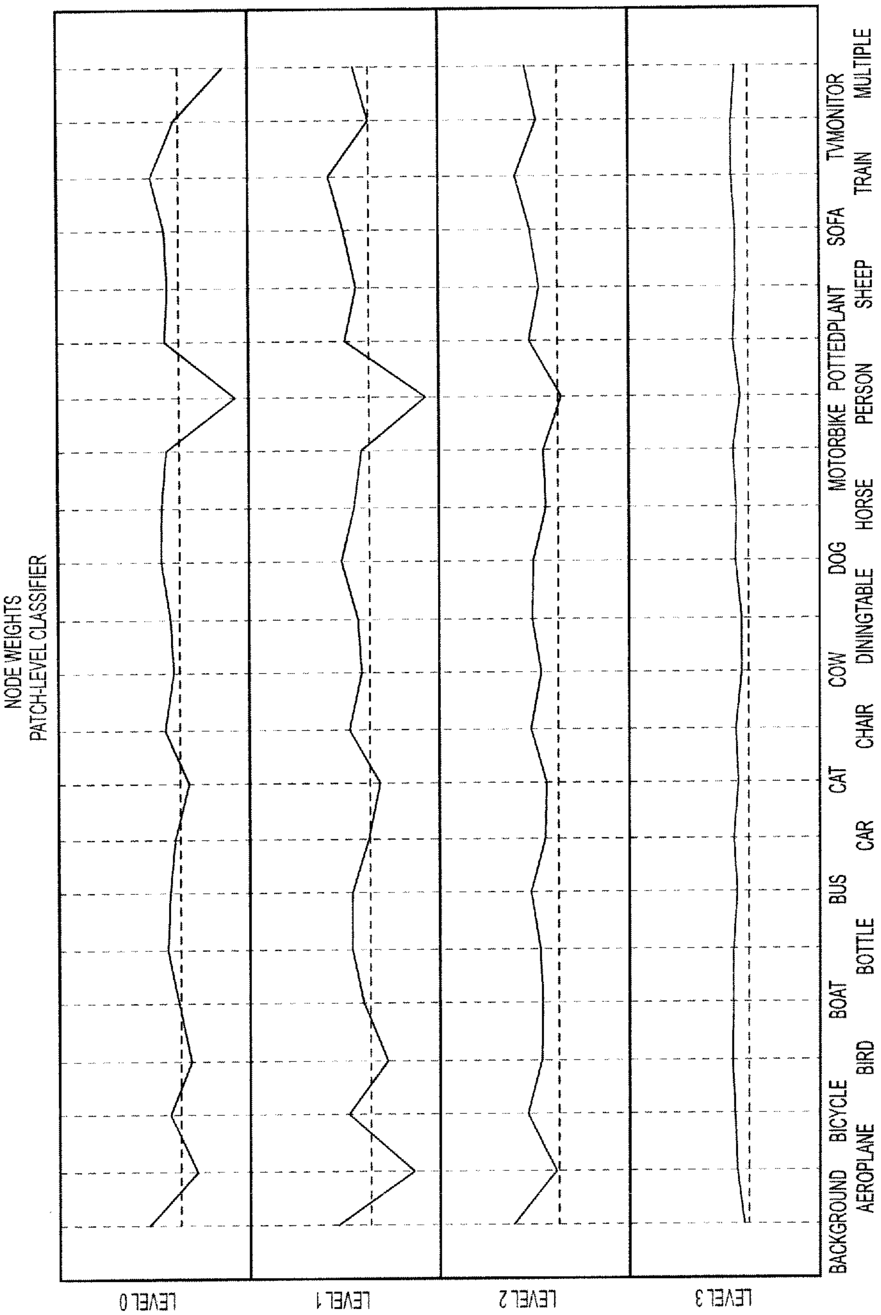
Figure 6D:
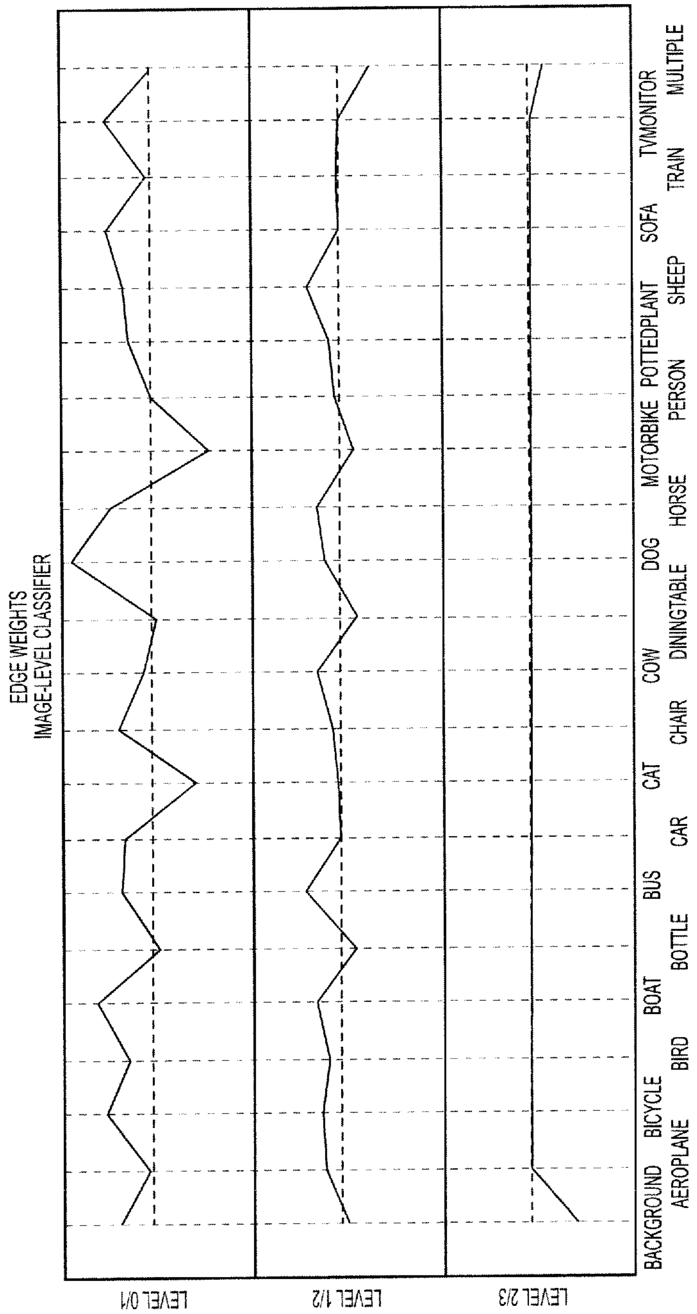
Figure 6E:
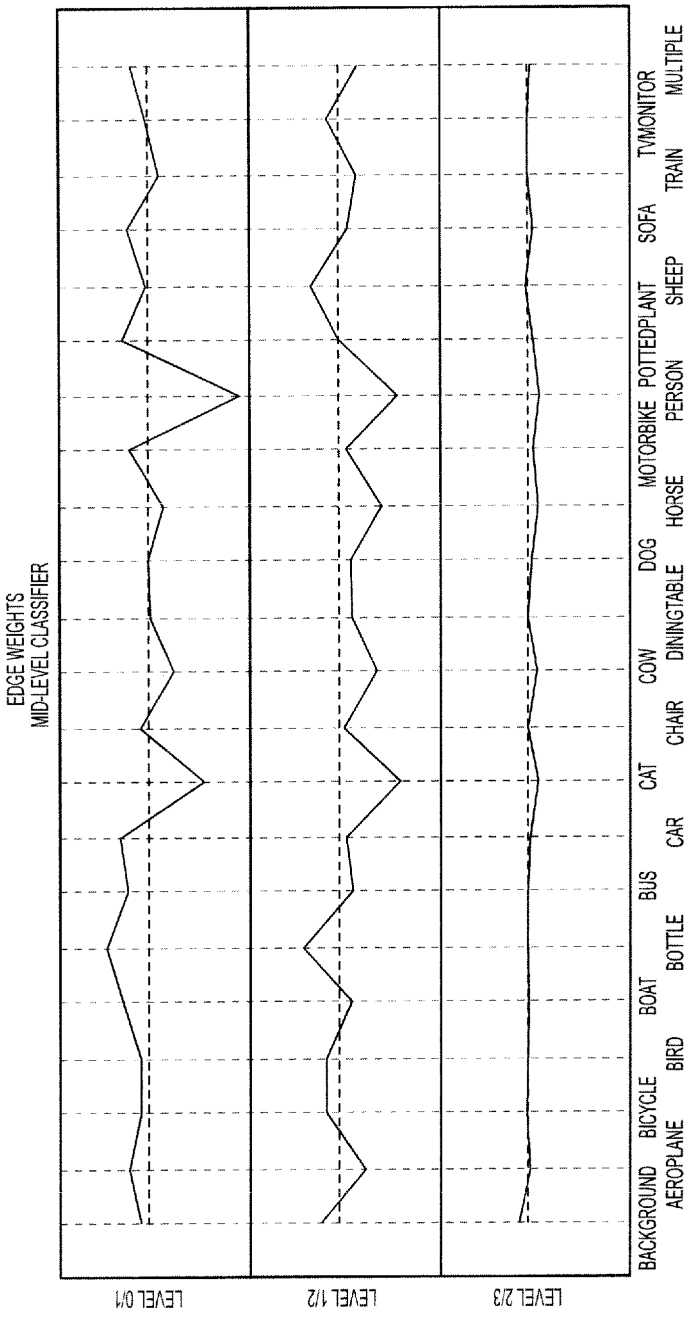
Figure 6F:
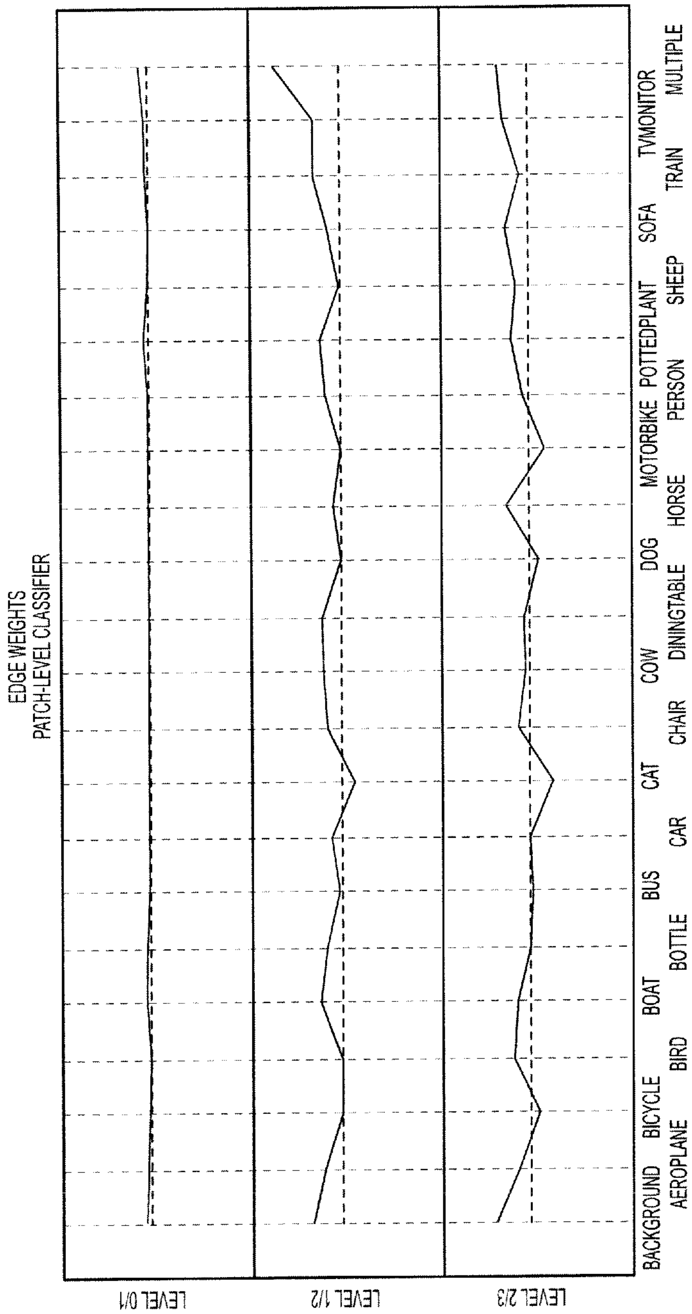

With reference to FIG. 5, an image region classifier is diagrammatically shown that is trained using the training system of FIG. 1. The image region classifier receives an input image 70 to be classified. The recursive image partitioner 22 partitions the input image 70 using partitioning as described herein with reference to FIGS. 2 and 3 so as to generate a tree structure of image regions. The features extractor 24 selects image key points or patches across the image and quantifies each key patch by a features vector having elements quantitatively representing aspects of the key patch, so as to generate feature vectors representative of the image regions. The partitioning and features extraction is performed such that there is at least one image key patch in each image region. In some embodiments, the smallest (leaf) image regions are each characterized by a single image key patch.

The classifiers 44, 46, 48 as trained by the corresponding classifier trainers 34, 36, 38 (see FIG. 1) are applied to classify the image regions and generate the probabilistic classification values $P_{x,y(x)}$. A class labeler 72 generates the unary and pairwise classification potentials 52, 54 based on the probabilistic classification values $P_{x,y(x)}$, for example using Equations (2) and (5) respectively, and optimizes the objective function comprising an aggregation of the unary classification potentials 52 and the pairwise classification potentials 54. for example using the objective function of Equation (6) where the unary classification potentials 52 are weighted by the node weights $\theta^{nodes}$ 60 and the pairwise classification potentials 54 are weighted by the edge weights $\theta^{edges}$ 62. Again, the weights ($\theta^{nodes}; \theta^{edges}$) 60, 62 are obtained from the training as described herein with reference to FIG. 1.

The output of the objective function optimization performed by the class labeler 72 is the full set of labels $\mathcal{Y}$ for the image regions including the full image (which corresponds to the image "region" at level 0) that maximizes the objective function of FIG. 6. The full set of labels $\mathcal{Y}$ includes labels for each image region of every level of the tree structure, optimized using the optimization function of Equation (6) to simultaneously satisfy the node potentials that are indicative of how well the assigned labels match the individual image regions considered separately) and the pairwise (edge) potentials that ensure compliance with the inheritance constraints defined by a hierarchy of classes for nodes connected by edges of the tree structure. The assigned set of labels $\mathcal{Y}$ are generally probabilistic in nature, and optionally a post-processor 76 employs thresholding, selection of the "most probable" label for each image region, a user review of the labeling performed using a graphical user interface (GUI) implemented on the computer 10, or other post-processing to assign the final labels to the image regions.

The disclosed image region classifier techniques have been applied to images from the Visual Object Classes (VOC) challenge VOC 2007 and VOC 2008 datasets. In these tests, images from the VOC 2008 dataset were used for training and validation, and images from the VOC 2007 dataset for testing. This presents a learning scenario in which there is a realistic difference between the training and test sets. The training, validation, and test sets contain 2113, 2227, and 4952 images respectively. The validation set is used to choose the optimal value of the regularization constant λ. Scale-invariant feature transform (SIFT)-like features were extracted for the model on uniform grids at 5 different scales. See Lowe, "Distinctive image features from scale-invariant keypoints", IJCV, 60(2): 91-110 (2004). The methodology of Csurka and Perronnin, "a simple high performance approach to semantic segmentation", in British Machine Vision Conference (BMVC) (2008) (hereinafter "the BMVC reference"). based on Fisher vectors was used to extract a signature for each region. An image key patch is considered to belong to an image region of the tree structure if (1) the center of the image key patch lies in the image region and (2) overlap of the image key patch with the image region is at least 25%. Three different first-order classifiers were used as the classifiers 44, 46, 48, based on sparse logistic regression: one classifier which has been trained to classify the entire collection of features in an image (the 'image-level' classifier 44); one classifier which has been trained on bounding boxes (the 'mid-level' classifier 46); and one classifier which has been trained on individual patches (the patch-level classifier 48). The baseline to which the classifier of FIG. 5 trained as set forth with reference to FIG. 1 is compared is one which simply selects the highest score using the three individual classifiers 44, 46, 48 without using consistency information. In other words, the comparison classifier replaces the class labeler 72 with a simple maximum probability selector operating on each image region separately.

As another comparison, the aforementioned "maximum probability selector" approach of the BMVC reference is modified by using the image prior as also defined in the BMVC reference. The effect of this modification is to reject labelings at the patch level which are inconsistent with the probability scores at the image level.

As yet another comparison, a "non-learning" approach was employed, which is implemented as the classifier of FIG. 5 but with equal weight assigned to all features (that is, the node and edge weights ($\theta^{nodes};\theta^{edges}$) are not learned using the training approach of FIG. 1, but rather are set to uniform equal values).

Classification scores for the classes "background" and "multiple" were extracted automatically from the first-order scores: the probability of belonging to the background is 1 minus the highest probability of belonging to any other class; the probability of belonging to multiple classes is the twice the product of the two highest probabilities, capped at 1 (so that if two classes have probabilities greater than 0.5, the product will be greater than 0.5 also). Structured learning was performed using the "Bundle Methods for Risk Minimization" code as described in Teo et al., "A scalable modular convex solver for regularized risk minimization", in KDD 2007 (Thirteenth ACM SIGKDD International Conference on Knowledge Discovery and Data Mining). This solver requires only that we specify the feature representation $\Phi(\mathcal{X},\mathcal{Y})$, the loss $\Delta(\mathcal{X},\mathcal{Y})$, and a column-generation procedure.

TABLE 1

| | Training | Validation | Testing |
|---|---|---|---|
| BMVC reference | 0.272 (0.004) | 0.273 (0.004) | 0.233 (0.003) |
| BMVC reference with image prior | 0.275 (0.005) | 0.276 (0.004) | 0.238 (0.003) |
| Non-learning (FIG. 5 but with ($\theta^{nodes}$; $\theta^{edges}$) set to be uniform | 0.235 (0.006) | 0.224 (0.005) | 0.233 (0.004) |
| Learning (FIG. 5 with learned values for ($\theta^{nodes}$; $\theta^{edges}$) | 0.460 (0.006) | 0.456 (0.006) | 0.374 (0.004) |

A performance comparison between the learning and non-learning versions of our approach, as well as the baseline is shown in Table 1, which tabulates performance of the learned classifier of FIG. 5 during training, validation, and testing (for the optimal value of the regularization constant $\lambda$), compared to the non-learning method in which the FIG. 5 classifier is used without training the weights ($\theta^{nodes};\theta^{edges}$) and the two non-learning methods of the BMVC reference. The values tabulated in Table 1 are the proportion of correctly labeled regions, with each level contributing equally (i.e., one minus the loss). Values in parentheses in Table 1 indicate the standard error (across all images). Significant improvement in classification accuracy is observed for the method disclosed herein with learned tree node and edge weights.

TABLE 2

| | Level 0 | Level 1 | Level 2 | Level 3 |
|---|---|---|---|---|
| BMVC reference | 0.342 | 0.214 | 0.232 | 0.163 |
| BMVC reference with image prior | 0.342 | 0.217 | 0.242 | 0.169 |
| Non-learning (FIG. 5 but with ($\theta^{nodes}$; $\theta^{edges}$) set to be uniform | 0.426 | 0.272 | 0.137 | 0.112 |
| Learning (FIG. 5 with learned values for ($\theta^{nodes}$; $\theta^{edges}$) | 0.413 | 0.307 | 0.349 | 0.444 |

Table 2 shows the contribution to the loss made by each level of the tree structure. It is seen that the performance for the learned classifier of FIG. 5 with trained values for the weights ($\theta^{nodes};\theta^{edges}$) is substantially uniform across the image region sizes. In contrast, the reference classifiers show substantial performance degradation at the smaller image regions. This suggests that the disclosed image regions classifier which enforces class inheritance as defined by the hierarchy of classes 30 provides enhanced classification accuracy over the various image region size scales.

With reference to FIG. 6, the trained node and edge weights ($\theta^{nodes};\theta^{edges}$) 60, 62 are plotted for the classifier training performed using the VOC 2008 dataset. The hierarchy of classes 30 here included 22 classes (that is, $|\mathcal{H}|=22$), with the class labels shown along the abscissa of FIG. 6. A separate vector of 22 weights corresponding to the $|\mathcal{H}|$ classes was learned for each image level 0, 1, 2, 3, and for each type of classifier 44, 46, 48 being used (the dashed line corresponds to zero). The learned weights shown in FIG. 6 have some interesting properties. For example, the image level classifier is generally weighted to have higher importance at the top levels (corresponding to the larger image regions), whereas the patch-level classifier is generally weighted to have higher importance at the bottom levels (corresponding to the smaller image regions). Substantial variance between weights of different classes is observed, especially for the "multiple", "background", and "person" classes, indicating that certain classes are easier to identify at different scales. Furthermore, the edge weights have both large positive and negative scores: for instance, the high weight given to 'dog' for the image-level classifier at level 0/1 indicates that the features between these two levels should be very similar, whereas the negative weight given to 'cat' (at the same level) indicates that the features between the two levels should be very different.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image classifier comprising:

A digital processor configured to perform operations comprising:

recursively partitioning an image into a tree of image regions having the image as a tree root and at least one image patch in each leaf image region of the tree;

classifying the image regions using at least one classifier; and outputting classification values for the image regions based on the classifying and on weights assigned to the nodes and edges of the tree.

2. The image classifier as set forth in claim 1, wherein the output classification values are constrained by a hierarchy of classes.

3. The image classifier as set forth in claim 2, wherein the constraint by a hierarchy of classes is applied by the weights assigned to edges of the tree.

4. The image classifier as set forth in claim 1, wherein the digital processor is configured to further perform an operation comprising:

assigning labels to one or more image regions based on the output classification values.

5. The image classifier as set forth in claim 1, wherein the digital processor is configured to further perform operations comprising:

repeating the recursive partitioning, classifying, and outputting for a plurality of images; and retrieving one or more images of the plurality of images based on the output classification values for the image regions of the plurality of images.

6. The image classifier as set forth in claim 5, wherein the digital processor is configured to further perform in cooperation with a display an operation comprising:

displaying the retrieved one or more images of the plurality of images.

7. The image classifier as set forth in claim 1, wherein the at least one classifier includes a plurality of classifiers trained at different size scales, and the outputting comprises:

generating the output classification values by optimizing an objective function comprising an aggregation of:

(i) unary potentials defined by the classifying of image regions using classifiers trained at different size scales weighted by the weights assigned to the nodes of the tree and (ii) pairwise potentials defined by pairs of the classifying of image regions using classifiers trained at different size scales connected by edges of the tree weighted by the weights assigned to the edges of the tree.

8. The image classifier as set forth in claim 1, wherein the at least one classifier includes a plurality of classifiers, and the digital processor is configured to further perform operations comprising:

training the classifiers trained at different size scales using a training set of pre-classified image regions of different sizes; and determining values of the weights assigned to the nodes and edges of the tree based on the classifiers trained at different size scales and the training set of pre-classified image regions of different sizes.

9. An image classification method comprising:

recursively partitioning an image into a tree of image regions having the image as a tree root and at least one image patch in each leaf image region of the tree, the tree of image regions having nodes defined by the image regions and edges defined by pairs of nodes connected by edges of the tree of image regions;

assigning unary classification potentials to nodes of the tree image regions;

assigning pairwise classification potentials to edges of the tree of image regions; and labeling the image regions of the tree of image regions based on optimizing an objective function comprising an aggregation of the unary classification potentials and the pairwise classification potentials;

wherein the recursive partitioning, the assigning of unitary classification potentials, the assigning of pairwise classification potentials, and the labeling are performed by a digital processing device.

10. The image classification method as set forth in claim 9, wherein the unary potentials are parameterized by a set of first-order classifiers.

11. The image classification method as set forth in claim 10, further comprising:

training the set of first-order classifiers using a training set of pre-classified image regions; and training parameters of the objective function using the same training set of pre-classified image regions;

wherein the recursive the training of the set of first-order classifiers and the training of parameters of the objective function are performed by the digital processing device.

12. The image classification method as set forth in claim 9, wherein the unary potentials are parameterized by a set of classifiers trained at different size scales.

13. The image classification method as set forth in claim 9, wherein the pairwise potentials encode inheritance constraints defined by a hierarchy of classes.

14. The image classification method as set forth in claim 9, wherein the unary potentials are parameterized by a set of classifiers and the pairwise potentials encode inheritance constraints defined by a hierarchy of classes.

15. The image classification method as set forth in claim 14, wherein the unary potentials are parameterized by a set of first-order classifiers trained at different size scales.

16. The image classification method as set forth in claim 9, wherein the optimizing employs a Junction Tree Algorithm.

17. The image classification method as set forth in claim 9, wherein the objective function can be decomposed into a sum of the unary classification potentials and the pairwise classification potentials.

18. A non-transitory storage medium storing instructions executable by a digital processor to perform an image classification method comprising:

recursively partitioning an image into a tree of image regions having the image as a tree root and at least one image patch in each leaf image region of the tree, the tree having nodes defined by the image regions and edges defined by pairs of nodes connected by edges of the tree;

assigning classification values to each node using a plurality of classifiers trained at different image size scales;

assigning a unary classification potential to each node based on the classification values assigned using the plurality of classifiers;

assigning a pairwise classification potential to each edge of the tree based on the classification values assigned using the plurality of classifiers trained at different image size scales and on inheritance constraints defined by a hierarchy of classes; and labeling the image regions of the tree of image regions based on optimizing an objective function comprising an aggregation of the unary classification potentials and the pairwise classification potentials.

19. The non-transitory storage medium as set forth in claim 18, wherein the assigning classification values comprises:

assigning classification values to each node using a plurality of classifiers trained at different image size scales.

20. The non-transitory storage medium as set forth in claim 18, wherein the recursive partitioning comprises:

recursively partitioning the image into a quadtree of image regions.

* * * * *